Figure 1:
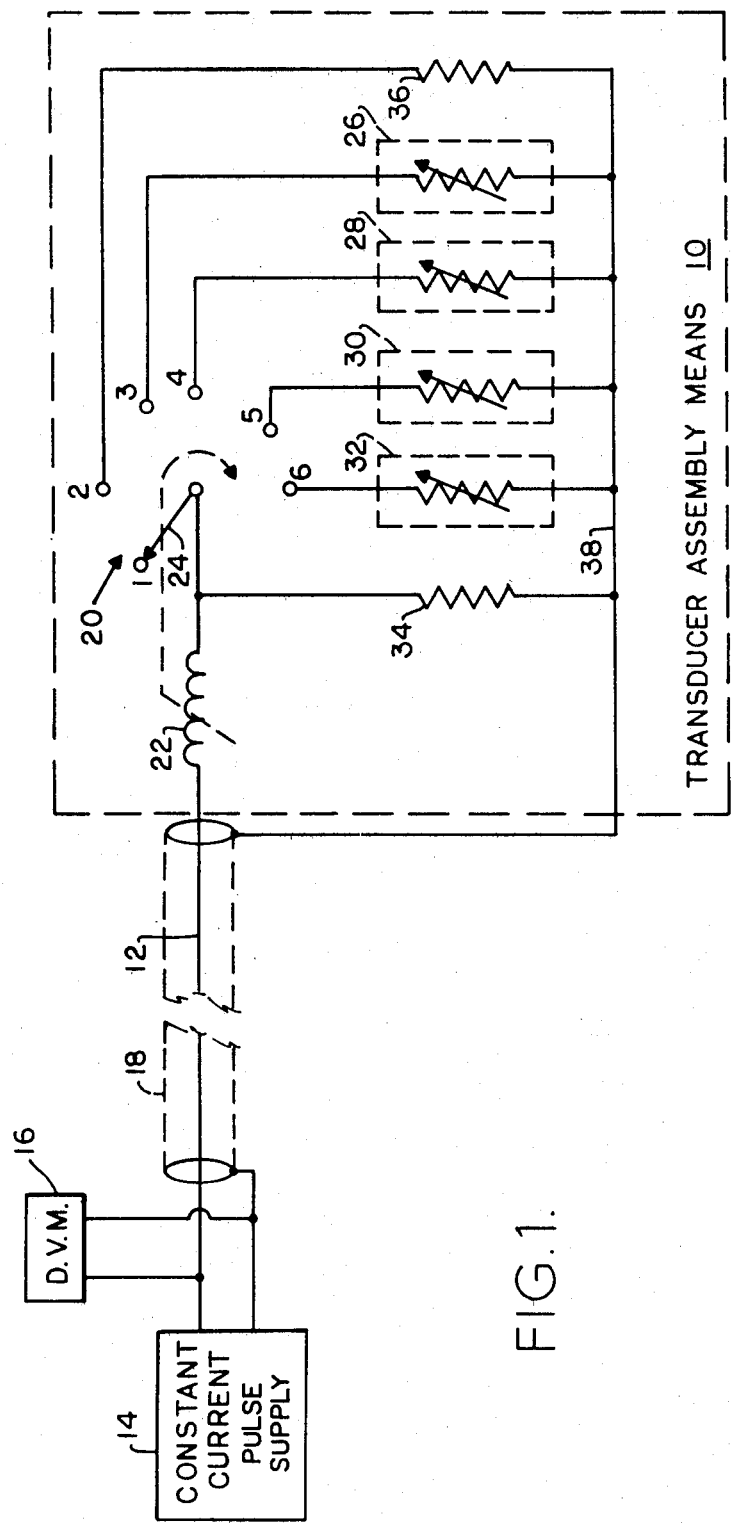

United States Patent [19]

Ginn

[11] Patent Number: 4,464,660

[45] Date of Patent: Aug. 7, 1984

[54] MULTICHANNEL REMOTE TRANSDUCER MONITORING SYSTEM

[75] Inventor: Warren G. Ginn, Pasadena, Calif.

[73] Assignee: S-Cubed, La Jolla, Calif.

[21] Appl. No.: 287,927

[22] Filed: Jul. 29, 1981

Related U.S. Application Data

[63] Continuation-in-part of Ser. No. 100,938, Dec. 6, 1979, Pat. No. 4,322,728.

[51] Int. Cl.³ .................. G08C 19/04; G08C 19/32
[52] U.S. Cl. .................. 340/870.38; 73/151; 340/870.04; 340/870.11; 340/870.39
[58] Field of Search .......... 340/870.38, 870.04, 340/870.11, 310 R, 310 A, 856–858, 870.01, 870.3, 870.27, 870.39, 870.13; 73/151, 154, 155; 324/239, 202, 62, 63

[56] References Cited

U.S. PATENT DOCUMENTS

| | | | |
|---|---|---|---|
| 2,132,213 | 10/1938 | Locke | 340/870.38 |
| 2,414,862 | 1/1947 | Fearon | 73/154 |
| 2,564,198 | 8/1951 | Elkins | 73/155 |
| 2,565,271 | 8/1951 | Sealander et al. | 340/870.17 |
| 2,819,408 | 1/1958 | Swift | 250/262 |
| 2,963,640 | 12/1960 | Buckner | 324/239 |
| 3,562,729 | 2/1971 | Hurd | 340/870.39 |
| 3,961,317 | 6/1976 | De Brem et al. | 340/870.09 |

FOREIGN PATENT DOCUMENTS 136832 1/1960 U.S.S.R.

OTHER PUBLICATIONS

*IBM Technical Disclosure Bulletin*, Barr, vol. 13, No. 8, Jan. 1971, pp. 2255-2256.

*Primary Examiner*—James J. Groody
*Attorney, Agent, or Firm*—Fitch, Even, Tabin & Flannery

[57] ABSTRACT

A transducer monitoring system includes a transducer assembly positioned at a remote location which operates to measure one or more separate physical phenomena. The transducer assembly is coupled to a central location, such as at the top of an oil drilling platform, by means of a single conductor cable. The transducer assembly comprises only passive components, including a stepper switch for separately selecting each of said transducer elements and for enabling current applied to said cable and transducer assembly to generate an output voltage representative of the present state of the resistance of each such transducer element. The improved invention requires only a single constant current pulse periodically applied to the cable to both generate said output voltage and to switch the stepper switch to the next contact. A calibration circuit that measures temperature effects on the transducer assembly and cable is also included.

9 Claims, 1 Drawing Figure

MULTICHANNEL REMOTE TRANSDUCER MONITORING SYSTEM

This is a Continuation-in-Part of application Ser. No. 100,938, filed on Dec. 6, 1979 now U.S. Pat. No. 4,322,728.

The present invention is directed to remote transducer monitoring systems, such as well logging systems, and more particularly to such systems wherein one or more physical phenomena may be measured by transducer elements through the operation of a passive circuit operative at very high temperatures. The circuit includes a stepper switch and a temperature calibration circuit. This switch is caused to step to successive switch contacts by means of a periodic constant current pulse. This current pulse also is coupled to a respective transducer element as a function of stepper switch position. All switching signals, transducer signals and circuit power is transmitted between the remote system and a central station by means of a single conductor cable.

Prior art remote transducer monitoring systems have generally been complex and unreliable devices. Such devices have either required that multiple conductor cable be used or that active devices or other complex circuitry be included at the remote station. Most are also pulse coded systems requiring synchronization signals. Such systems have suffered from malfunctions resulting from crosstalk, noise and pulse overshoot problems. U.S. Pat. No. 2,819,408 to Swift, for example, shows a subsurface instrument for well logging connected to the drilling platform via a single conductor cable, but having a plurality of power supplies, including batteries, an oscillator and other active elements at the remote location. In addition, this device measures only a single condition, and two different current pulses are required for proper operation thereof. U.S. Pat. No. 3,562,729 to Hurd is another example of a remote system having a complex circuit including active devices. U.S. Pat. No. 2,564,198 to Elkins illustrates a less complex transducer assembly for well testing, but it includes separate cable conductors for power to the stepper switch motor and for signals from the transducer elements. Russian Pat. No. 136,832 to Arbuzov illustrates another multiconductor remote transducer assembly including a stepper switch. U.S. Pat. No. 2,414,862 to Fearon shows a well surveying apparatus where a remote stepping motor is actuated by alternating current over a single conductor cable.

The problem with such prior art devices is that well logging systems or the like are being required to operate in deep oil or geothermal wells of much higher downhole temperatures than in the past, and at greater distances from the surface, e.g. of the order of miles from the surface. Prior art devices having active components are generally inoperative above about 200° C. Active devices are generally defined as devices that can provide power gain greater than unity, e.g., transistor devices. Passive devices, however, are generally devices that cannot act as a source of power, e.g. resistors, capacitors, inductors and relays. Thus, simple, high reliability transducer measuring assemblies operative by means of a less expensive single conductor cable, and operative at much higher than previously seen temperatures, are desired. The present invention provides such high temperature operation advantages since it comprises only passive components. With the present invention, operation at temperatures several orders of magnitude higher than 200° C. are realizable. Such single conductor cables are also able to operate in higher temperature environments, do not have the problem of cross talk with adjacent conductors, and are more easily handled than multiconductor cable.

Accordingly, an object of the present invention is to provide a remote transducer monitoring system requiring only a single conductor cable.

A further object of the present invention is to provide a transducer monitoring system of simple design and installation, using passive components operative at temperatures above those in which active devices normally are able to operate, thereby providing highly reliable operation in severe remote environments.

Another object of the present invention is to provide a transducer monitoring system wherein both switching and measuring operations of the system are enabled by means of a plurality of constant current pulses of equal magnitude and duration.

A still further object of the present invention is to provide for automatic temperature calibration means in the transducer assembly at the remote end of the cable.

These and other objects and advantages of the present invention will become more apparent upon reference to the following description and the accompanying drawing, in which FIG. 1 is a schematic diagram of a remote transducer monitoring system according to the present invention.

Generally, the present invention is directed to an apparatus for monitoring one or more transducer elements positioned in a transducer assembly at a remote location. More specifically, the present invention is designed to sense the present pressure and temperature at the bottom of oil or geothermal wells or at other remote stations, as well as sensing other physical phenomena, as desired. The apparatus makes successive transducer measurements at the remote location over a single conductor cable by operating a stepper switch. This switch makes contact successively with each transducer element. Conventional transducer elements include variable resistor components. Such resistors vary as a function of the change in the given physical phenomena to be measured, e.g., the well temperature may cause the resistance to vary at a rate of 10 ohms per 100° C.

The stepper switch includes a relay coil which is connected in series between the single conductor cable and the transducer elements, and is energized by the constant current pulse sent down said cable from the surface. Interruption of the energizing current causes the relay coil to step the switch to the next transducer measuring resistor. While the current is on, it provides means for generating an output voltage across the resistor presently connected thereto via said switch.

The stepper switch operates in a first position to connect the current pulse to a comparator resistor. At a second position, a calibration resistor is placed in parallel with the comparator resistor. In successive positions of the stepping switch, one or more respective successive transducer element measuring resistors are substituted for the calibration resistor in parallel with said comparator resistor.

As seen in FIG. 1, the main elements of the present invention include a transducer assembly means 10 installable in a simple manner in a deep well or other remote station. This transducer assembly means 10 is connected to a central location at the surface of the drilling platform, or at whatever given central location is provided, by means of a single conductor cable 12. At the surface, the single conductor cable 12 is connected to a constant current supply 14 and a conventional digital voltage meter (DVM), shown at 16. The current supply 14 provides a periodic current pulse of predetermined fixed amplitude to provide remote transducer assembly operation as hereinafter described. The DVM provides means for measuring the voltage resulting from the current output by said current supply 14. The single conductor cable may be a one wire line using the earth as a ground return, or it may be a standard single conductor cable with ground return by means of a conventional cable sheath or shield for the cable 12, as shown diagramatically at 18.

The transducer assembly means 10 includes a stepper switch 20 including a relay coil 22, a swinger arm 24, and a plurality of switch contacts 1-6. The stepper switch operates to move the swinger arm 24 to a successive switch contact whenever current is terminated from the relay coil 22. This is enabled since coil 22 is connected in series between cable means 12 and the swinger arm 24. That is, one pole of said coil is connected to cable means 12 and its other pole to swinger arm 24.

The swinger arm 24 automatically contacts each successive switch contact 1-6 and then on the next current termination returns to switch contact 1. That is, stepper switch 20 continues to successively contact each of its switch contacts as a function of the current across relay coil 22.

The transducer assembly means 10 also includes a plurality of transducer elements indicated at 26, 28, 30 and 32. Each transducer element is designed to measure a selected physical phenomena, as described above, such as with a resistively variable temperature probe, or with a potentiometric pressure transducer element. Thus, each transducer element 26-32 indicates a change in its respective physical phenomena being measured by varying its resistance in a conventional manner. As can be seen in FIG. 1, each transducer element 26-32 is connected between a respective switch contact of stepper switch 20 and assembly ground, indicated at 38. Thus, successive current pulses from the current supply 14 are coupled across each of the variable resistors of the transducer elements 26-32, for generation of an output voltage measurable .y DVM 16.

To provide an accurate indication of the variation in each of the transducer resistors 26-32, both a comparator resistor 34 and a calibrate resistor 36 are also included as part of the transducer assembly means 10. The comparator resistor 34 is connected such that it is in shunt with each of the respective transducer element resistors as they are accessed by the stepper switch 20.

To provide a preliminary indication of the voltage contribution generated by the comparator resistor 34, a switch contact position of the stepper switch 20, indicated as switch contact 1 in FIG. 1, is left unconnected, so that the current from the current supply 14 is allowed only to go through the single path provided by the resistor 34. Note also that coil 22 is connected in series with resistor 34 and the rest of the resistor network, which comprises respectively resistors 26, 28, 30, 32 and 36, depending on the position of the stepper switch 20. The resistance of coil 22 is typically about 50 ohms. Thus, this initial step of measuring the voltage generated only by the resistor 34 circuit path also provides means for measuring and thereby taking into account the voltage generated across the coil 22.

For best operation of the transducer assembly means 10, both comparator resistor 34 and calibrate resistor 36 should be resistors of high accuracy and temperature stability, e.g., a one percent 100 ohm resistor.

The calibrate resistor 36 is connected in parallel with resistor 34 when the stepper switch is positioned to contact switch contact 2. This step enables a user to know precisely what voltage an accurate fixed resistance will generate when connected in parallel with resistor 34. The DVM 16 may be of a type to store this voltage level and algebraically compare it with the subsequent voltage levels as generated by the transducer element resistors 26-32.

Thus, in operation, assuming for explanatory purposes that the swinger arm 24 is initially at switch contact 1, a constant current of 100 milliamps, for example, is applied to energize relay coil 22 and establish a maximum output voltage level to the DVM 16. When the constant current pulse is removed, the relay coil 22 causes the stepper switch to move the swinger arm 24 to switch contact 2. Then, when the constant current pulse is reapplied by the current supply 14, an output voltage indicative of resistor 34 in parallel with the calibration resistor 36 is established. Thereafter, when the subsequent current pulses from current supply 14 cause respective resistors in transducer elements 26-32 to be sequentially switched in parallel with resistor 34, each establishes its own voltage level. These levels are compared with the voltage level generated by the resistor network comprising resistors 34 and 36. Since these latter resistors are stable known resistances, the resistance of each of the transducer elements 26-32 can be calculated from the difference voltages.

It is to be understood that the foregoing description merely illustrates a preferred embodiment of the present invention, and that various modifications, alternatives and equivalents thereof will become apparent to those skilled in the art. Accordingly, the scope of the present invention should be defined by the appended claims and equivalents thereof.

What is claimed is:

1. An apparatus for monitoring physical phenomena at a remote location comprising:
   a single conductor cable means having a near and a remote end;
   means for periodically impressing a current pulse of fixed magnitude on said cable means at its near end thereof;
   a transducer assembly means connected to the remote end of said cable means and including one or more transducer elements, each element varying in resistance as a function of the change in the physical phenomena being monitored by said element, and temperature insensitive passive means for selectively accessing each said transducer element, whereby said transducer assembly means is capable of operation at temperatures substantially in excess of 200° C., comprising:
   (i) a stepper switch having a plurality of contacts and a swinger arm moveable along said contacts in a predetermined sequence, each said transducer element coupled to a respective one of said contacts;
   (ii) means for coupling said current pulse from said cable means to said swinger arm;

(iii) means responsive to the termination of each said current pulse for moving the swinger arm of said stepper switch to the next contact in said sequence; and means at the near end of said cable means for measuring the voltage generated by said current pulse.

2. The apparatus of claim 1 wherein said stepper switch includes a relay coil and wherein said means responsive to each current pulse termination comprises the connection in series of said coil between said cable means and said swinger arm.

3. The apparatus of claim 1 wherein said transducer assembly means further comprises a fixed calibrate resistor element coupled to one of said contacts on said stepper switch.

4. An apparatus for monitoring a plurality of physical parameters at a remote location comprising:
   a single conductor cable means having a near end and a remote end;
   means for periodically impressing a current pulse of fixed magnitude on said cable means at its near end thereof;
   a transducer assembly means including at least two transducer elements, each element varying in resistance as a function of the variation in the parameter being monitored by said element, and passive means for selectively accessing each said transducer element comprising:
   (i) a stepper switch having a plurality of contacts, a swinger arm moveable along said contacts in a predetermined repeatable sequence, and a relay coil, each said transducer element coupled to a respective one of said contacts;
   (ii) means for coupling said current pulse from said cable means to said swinger arm, and including means responsive to the termination of each said current pulse for moving the swinger arm of said stepper switch to the next contact in said sequence, said means including coupling one pole of said relay coil to the remote end of said cable means and the other pole of said relay coil to said swinger arm; and
   means at the near end of said cable means for measuring the voltage generated by said current pulse.

5. The apparatus of claim 4 further comprising a fixed comparator resistor coupled to said swinger arm and a fixed calibrate resistor coupled to one of said contacts on said stepper switch.

6. A method for measuring a plurality of physical parameters by means of a transducer assembly positioned at a remote location and connected to a near location via a single conductor cable means having a near end and a remote end, said assembly including a plurality of transducer elements and passive means for selectively accessing each said transducer element, said passive means including a stepper switch wherein each said transducer element is coupled to a respective switch contact on said switch, comprising the steps of:
   (a) applying a constant current pulse to said cable means at its near end thereof;
   (b) measuring at said near end of said cable means the voltage generated by said current pulse;
   (c) switching said stepper switch to a next switch contact in response to the termination of said current pulse; and
   (d) repeating of steps (a)–(c).

7. A method for measuring at least one physical parameter by means of a transducer assembly positioned at a remote location and connected to a near location via a single conductor cable means at its near end, said transducer assembly connected to the remote end of said cable means, said assembly including one or more transducer elements and temperature insensitive passive means for selectively accessing each said transducer element, whereby said transducer assembly is capable of continuous operation at temperatures substantially in excess of 200° C., said passive means including a stepper switch wherein each said transducer element is coupled to a respective switch contact on said switch, and including a calibrate resistor coupled to a first said switch contact, comprising the steps of:
   (a) switching said stepper switch to said first switch contact in response to the termination of a current pulse on said cable means;
   (b) coupling a constant current pulse onto said cable means at its near end thereof and measuring the voltage generated on said cable means thereby;
   (c) switching said stepper switch to a predetermined next switch contact having a transducer element connected thereto in response to the termination of the current pulse on said cable means generated in the previous step;
   (d) coupling a constant current pulse onto said cable means at its near end thereof and measuring the respective voltage generated on said cable means by such element thereby;
   (e) repeating of steps (c) and (d) for each transducer element connected to said stepper switch; and
   (f) repeating of steps (a)–(e).

8. The apparatus of claim 4 wherein said passive means comprises temperature insensitive means whereby the transducer assembly means is capable of continuous operation at temperatures substantially in excess of 200° C.

9. The method of claim 6 wherein said passive means comprises temperature insensitive means whereby the transducer assembly is capable of continuous operation at temperatures substantially in excess of 200° C.

* * * * *

UNITED STATES PATENT AND TRADEMARK OFFICE
CERTIFICATE OF CORRECTION

PATENT NO. : 4,464,660
DATED : August 7, 1984
INVENTOR(S) : Warren G. Ginn

It is certified that error appears in the above-identified patent and that said Letters Patent is hereby corrected as shown below:

Column 3, line 48: ".y" should read --by--.

Signed and Sealed this

Twenty-sixth Day of February 1985

[SEAL]

Attest:

DONALD J. QUIGG

Attesting Officer     Acting Commissioner of Patents and Trademarks